United States Patent [19]

Hawrylko et al.

[11] Patent Number: 4,957,983
[45] Date of Patent: Sep. 18, 1990

[54] METHOD FOR PROVIDING IMPROVED COLLOIDAL STABILITY AND POLYVINYL CHLORIDE USING A HOT CHARGE POLYMERIZATION PROCEDURE WITH EMULSIFIER PACKAGE

[75] Inventors: Roman B. Hawrylko, Avon Lake, Ohio; Richard A. Widdifield, Niagara Falls, Canada

[73] Assignee: The B. F. Goodrich Company, Akron, Ohio

[21] Appl. No.: 362,627

[22] Filed: Jun. 7, 1989

[51] Int. Cl.$^5$ .............................................. C08F 2/20
[52] U.S. Cl. .................................... 526/200; 526/202; 526/344.2
[58] Field of Search .......................................... 526/200

[56] References Cited

U.S. PATENT DOCUMENTS

| | | | |
|---|---|---|---|
| 4,324,878 | 4/1982 | Biaggi | 526/200 |
| 4,464,519 | 8/1984 | Mango | 526/200 |
| 4,526,946 | 7/1985 | Fitzpatrick | 526/202 |

OTHER PUBLICATIONS

Technical Publication of Kuraray Co., Ltd.

Primary Examiner—Christopher Henderson
Attorney, Agent, or Firm—Daniel J. Hudak; Joe A. Powell

[57] ABSTRACT

A method for polymerizing polyvinyl chloride and polyvinyl chloride copolymers is provided in which a monomer slurry is formed by adding the monomers and water (hot or cold) in the reaction vessel, and the slurry is brought to reaction temperature. After a time delay of 0 to 15 minutes, an emulsifier package is added, and after a further time delay of 0 to 15 minutes, a catalyst emulsion is added. The emulsifier package comprises a primary emulsifier which is partially saponified polyvinyl alcohol having a degree of saponification between about 60 and about 90 mole percent and a solubility in methanol index at 55° C. in a range of up to about 60 percent. A secondary emulsifier is included in the emulsifier package which is a preferably cellulosic type emulsifier. Preferably an additional emulsifier is added which is a hydrolyzed polyvinyl acetate having a degree of hydrolysis of at least 68 percent. The polymerization product has good bulk density and porosity parameters. Resins produced from this product have low fisheye characteristics.

9 Claims, No Drawings

METHOD FOR PROVIDING IMPROVED COLLOIDAL STABILITY AND POLYVINYL CHLORIDE USING A HOT CHARGE POLYMERIZATION PROCEDURE WITH EMULSIFIER PACKAGE

FIELD OF THE INVENTION

The invention relates generally to a method of polymerizing polyvinyl chloride 9PVC) and PVC copolymers using a hot charge procedure and an emulsifier package. The emulsifier package comprises a primary emulsifier which is a partially saponified polyvinyl alcohol (PVA) and a secondary emulsifier which is a cellulosic emulsifier. An optional additional polyvinyl alcohol emulsifier may be added. The invention further relates to the resultant PVC products.

BACKGROUND

It is currently known to use a partially saponified polyvinyl alcohol emulsifier having a degree of saponification between about 60 and 90 mole percent and a solubility-in-methanol index at 55° C. of at least up to about 60 percent. An example of such an emulsifier is Poval L9 sold by Kurara Co., Ltd. of Japan. This emulsifier has advantages in that it can be used at lower concentrations and it results in superior polymerization product, namely, the product has improved porosity and low gel content. However, in the past, it has not been known how to take advantage of the use of this emulsifier in "hot charge" reaction vessels. Specifically, at temperatures above 40° C. the emulsifier causes an unstable suspension and difficulties in particle size control.

SUMMARY OF THE INVENTION

The process of the present invention solves the foregoing problems by providing a set of process parameters which result in a stable suspension even in hot charge polymerizations. Further, the partially saponified type PVA emulsifier is used as a primary emulsifier in an emulsifier package with a secondary emulsifier which is a cellulosic type emulsifier.

The invention comprises a hot charge polymerization method for the polymerization of polyvinyl chloride, or polyvinyl chloride type polymers which includes the following steps:

(a) introducing vinyl chloride monomer and optional comonomer or comonomers, and water into a reaction vessel to form a monomer mixture, and bringing said mixture to a reaction temperature between about 40 and 80° C., and preferably between about 50° and 70° C.;

(b) waiting for a period of from 0 to 15 minute, and preferably from about 5 to 10 minutes, from the end of the addition of said monomer;

(c) adding an emulsifier package comprising 0.026 to 0.06 parts per hundred monomer by weight of a primary emulsifier which is a partially saponified polyvinyl alcohol emulsifier having a degree of saponification between about 60 and 90 mole percent and a solubility in methanol index at 55° C. of at least up to about 60 percent, and from about 0.002 to about 0.02 parts per hundred monomer by weight of a secondary emulsifier which is either a substituted cellulosic emulsifier or a hydrolyzed polyvinyl alcohol;

(d) waiting for a second period of from 0 to 15 minutes and preferably 5 to 10 minutes from the end of the addition of said emulsifier package; and (e) adding an effective amount of a catalyst, and specifically a catalyst emulsion.

A novel polyvinyl chloride composition results having a bulk density of from about 0.49 to about 0.55 gm/ml, and preferably a 0.53 to about 0.54 gm/ml; a 90 percent void volume porosity within plus or minus 0.10 of 0.28 ml/gm; an average particle size of from about 110 to about 150 microns; preferably 125 to 135; and a low 60 mesh count.

An advantage of the present invention is the providing of a process which permits the use of a partially saponified PVA type emulsifier in a hot charge reaction process. A hot charge reaction type polymerization process is more efficient than the similar cold charge reaction process, and moreover certain reaction vessels are equipped only to run a hot charge reaction.

A further advantage of the present invention is the production of improved polymerization product. The polyvinyl chloride, or polyvinyl chloride copolymers which result from the process of the present invention have a higher bulk density than prior art polyvinyl chlorides. A higher bulk density results in less expense for storage and shipping as well as better flow rates. In addition, the polymerization product has a uniform porosity and a low gel content. A low gel content results in PVC or PVC type resins having reduced fisheyes or specks in the film.

The product in accordance with the present invention can be used in any application suitable for high quality PVC and PVC type product, such as polyvinyl chloride for film in medical and food applications.

DETAILED DESCRIPTION OF THE INVENTION

The invention relates generally to a process for the production of polyvinyl chloride and polyvinyl chloride copolymers using a "hot charge" polymerization process. By "hot charge" polymerization process, it is meant a polymerization process in which the emulsifier is added to a monomer mixture or slurry which is at or near reaction temperature. In particular, it is used in this specification to indicate the condition in which the reaction slurry, i.e., the monomers and the water, are at a temperature of more than 40° C.. Typically the monomer slurry will be at a temperature of from about 40° to about 80° C., and more preferably from about 50° to about 70° C. The monomer slurry may be brought to temperature either by adding water to the monomers which has been heated above ambient temperature, or by heating the water and monomers after they are introduced into the reaction vessel. As used herein "bringing the reaction slurry or monomer mixture to reaction temperature" means either heating the mixture within the reaction vessel, or adding heated water and/or monomers. The polymerization process of the present invention will be used in reaction vessels as known in the art, such as from 3 liter to 40,000 gallon reactors.

The process of the invention may be used in the polymerization of vinyl chloride monomers, or of vinyl chloride and comonomers such as are known in the art. It is envisioned that in the event that a comonomer is used, the copolymer has a vinyl chloride content of at least 10 percent. Typical comonomers which may be polymerized with vinyl chloride are well known to the art and to the literature and include esters of acrylic acid wherein the ester portion has from 1 to 12 carbon atoms, for example, methyl acrylate, ethyl acrylate, butyl acrylate, octyl acrylate, cyanoethyl acrylate, and the like; vinyl acetate; esters of methacrylic acid wherein the ester portion has from 1 to 12 carbon atoms, such as methyl methacrylate, ethyl methacrylate, butyl methacrylate, and the like; styrene and styrene derivatives having a total of from 8 to 15 carbon atoms such as alpha-methylstyrene, vinyl toluene, chlorostyrene; vinyl naphthalene; diolefins having a total of from 4 to 8 carbon atoms such as butadiene, isoprene, and including halogenated diolefins such as chloroprene; monoolefins having from 2 to 10 carbon atoms and preferably 2 to 4 carbon atoms; and the like; and mixtures of any of the above types of monomers and other vinyl monomers copolymerizable therewith known to the art and to the literature. It is preferable, however, that the present invention be used for homopolymerization of vinyl chloride monomer.

The polymerization process of the present invention is as follows:

(a) the vinyl chloride monomers and water are added to a reaction vessel and brought to a temperature of greater than 40° C., and preferably from about 40° to about 80° C., and most preferably from about 50 to about 70° C.;

(b) a first delay period of 0 to 15, and preferably 5 to 10 minutes after the desired reaction temperature has been reached is allowed;

(c) an emulsifier package is added to said reaction vessel, said emulsifier package comprising a primary emulsifier and a secondary emulsifier, and optionally an additional emulsifier;

(d) a second delay or period of from 0 to 15 and preferably 5 to 10 minutes is allowed to elapse; and (e) an effective amount of a catalyst is added.

The emulsifier package which is used with the present invention includes a primary emulsifier which is a partially saponified polyvinyl alcohol emulsifier having a degree of saponification between about 60 and about 90 mole percent and a solubility and methanol index at 55° C. in a range of up to about 60 percent. An example of a suitable primary emulsifier is taught in U.S. Patent No. 4,226,966 to Shiraishi et al. The patent is assigned to Kurara Co., Ltd. of Japan. This reference is hereby fully incorporated as if completely rewritten herein. An example of such an emulsifier is sold under the name Poval L-9 by Kurara Co., Ltd. Similar products are made by Nippon Gohsei under the mark Gohsenol KZ06 and KZ05, and other products which perform similarly may also be available. Poval L-9 is a preferred primary emulsifier.

The secondary emulsifier used in the emulsifier package acts as a colloidal stabilizer and is a cellulosic type emulsifier or a hydrolyzed polyvinyl alcohol. Preferably it is a substituted cellulosic such as hydroxy propyl methocel. If the PVA is used, it appears necessary to use it at much higher levels than if the cellulosic is used. An example of a suitable type cellulosic emulsifier is Methocel F-50 sold by Dow Chemical. Commercial equivalents are sold by Hercules and Henkel.

It is further preferred to use an additional optional emulsifier which may be a hydrolyzed PVA emulsifier. The optional additional emulsifier is a second hydrolyzed polyvinyl acetate type dispersant having a percent hydrolysis greater than 68 percent. Examples are Alcotex 72.5, Alcotex 78L, Vinol 540, etc. Vinol 540 is 88 percent hydrolyzed .PVC and is preferred. The use of this optional emulsifier in combination with the cellulosic emulsifier has a synergistic effect in that the use of both types allows a reduction of the amount of emulsifier while achieving a comparable product. In the most preferred embodiment, the cellulosic is methocel and the optional emulsifier is Vinol 540. This combination has the additional synergistic effect of increasing the bulk density of the final product.

It is essential that all of the emulsifiers in the emulsification package are added at one time, that is either the emulsifiers are premixed before being charged from the hopper, or at least, the emulsifiers are added at the same time from a single hopper. Unsuitable polymerization product will result if the emulsifiers are added at different times.

The catalyst used may be any suitable catalyst for a polyvinyl chloride polymerization, including for example EHP (ethylhexyl peroxydicarbonate) and SBP (sec butyl peroxydicarbonate). The catalyst is added in an effective amount which is usually from 0.03 to 0.05 (or the molar equivalent) and preferably at 0.045 parts (or the molar equivalent) per hundred monomer by weight. In addition, it may be advantageous to use a catalyst emulsifier, such as a primary emulsifier, with the catalyst. In this case the catalyst emulsifier may be used in amounts of 0.004 to 0.024 parts per hundred monomer by weight, and preferably from 0.008 to 0.016 parts per hundred monomer by weight.

The polymerization product of the present invention has excellent bulk density, which is from about 0.49 to about 0.55 gm/ml, and preferably from about 0.53 to about 0.54 gm/ml. Furthermore, the product is a good powder mixture. It has a substantially uniform porosity and a 90, percent void volume porosity within plus or minus 0.10 of 0.28 ml/gm. These figures result in low gel content in products made from the polymerization product as is evidenced by a fisheye content of not more than one gel/$in^2$. The particles have an average particle size of from about 110 to about 150 $\mu$, and preferably from about 125 to about 135, and a low 60 mesh count.

EXAMPLES

The foregoing invention will be better understood with reference to the following examples.

A general polymerization procedure for use in a small scale reactor, i.e. 55 liter stainless steel, is given below:

The reactor is first coated internally with a protective coating to prevent reactor scaling and buildup. The reactor is then evacuated to about 29 inches of mercury. From about 146 to about 148 parts of deionized, demineralized water at ambient temperature are charged, followed by 100 parts vinyl chloride monomer. The contents of the reaction monomer are agitated at about 450 rpm and the mixture is heated. After the mixture has reached a temperature of about 53° to about 56° C. at from about 15 to, about 45 minutes, following the beginning of heating, the emulsifier package is added by an injection syringe which is subsequently flushed with from 2 to 4 parts of water to bring the total amount of water now added to 150 parts. Unless otherwise indicated, the emulsifier package is added after a delay which may range from about 30 seconds to about 5 minutes. This delay is represented by the time it takes for the emulsifier to be manually added to the reactor. The contents of the reactor are subsequently mixed for a period of time which is 15 minutes unless otherwise indicated, and then the catalyst solution is added. The addition means (i.e., the syringe) are subsequently flushed with 35 parts of deionized, demineralized water. The catalyst solution generally comprises a peroxy catalyst with an emulsifier. The polymerization is allowed to run at reaction temperature, i.e. 50° to 70° C. to completion as is indicated by a drop in pressure. The reaction is subsequently terminated by the addition of a shortstop. Alternatively, the polymerization process is aborted if the suspension appears to be unstable or the product appears to be bad.

Examples 1 and 7 deal with analogous manufacturing scale polymerization runs. In these runs, the reactions were run in a 16,500 gallon stainless steel reactor at analogous ratios of monomer to deionized, demineralized water. In the large scale reactor, the monomers and water are added at the same time, although the water is added at about 60° C. The emulsifier package is generally added as a premix, or charged simultaneously from the same hopper, after a delay of 0 to 15 minutes from the time that the monomer mixture reaches reaction temperature.

EXAMPLE 1

The first polymerization was run as a hot charged procedure in the 16,500 gallon manufacturing scale reactor as previously described. In the first two runs, the emulsifier consisted solely of Poval L9 at a level of 0.039 PHM by weight and the emulsifier was added simultaneously with the vinyl chloride and water. These runs were found to be unstable and were aborted. In the next run the addition of the emulsifier was delayed until after all of the water was charged. This polymerization run resulted in a satisfactory polymerization product. Subsequently, a polymerization run was preformed using Poval L9 at a level of 0.035 pHM where the addition of the emulsifier was delayed for a period of eight minutes from the addition of the water, and once again a satisfactory polymerization product was obtained. Additional polymerizations were run wherein Poval L9 was used as the emulsifier at a similar level, and added after a delay of usually about eight minutes from the addition of the water. These runs proved to have a success rate of less than about 50 percent. By a success rate, it is meant that in more than 50 percent of the cases, either an unsatisfactory product was obtained of the run was aborted due to suspension instability. It is noted that while there has been some success at using Poval L9 by itself as the emulsifier, if the addition of the emulsifier is delayed from the addition of the water and vinyl chloride, the rate of success is much too low to be commercially viable. For a successful commercial product, a success rate of virtually 100 percent must be achieved. Thus, it is imperative that the process utilized is consistently successful.

EXAMPLE 2

In this Example, two polymerization runs were run in the 55 meter reactor as previously described. In these polymerization runs, the emulsifier consisted solely of Poval L9 at a level of 0.0345 parts per hundred monomer. The catalyst was sec-butyl peroxydicarbonate (SBP) at a level of 0.03. The catalyst was added using Poval L9 in one instance as the catalyst emulsifier and using Vinol 540, a hydrolyzed PVA emulsifier having a percent hydrolysis of 88 percent in the other case. In both cases, this emulsifier was used at a level of 0.008 PHM. In both cases, the polymerization run resulted in a solid charge.

EXAMPLE 3

The following examples were run in the 55 liter reactor as previously described in demonstrating the improved effectiveness of using a secondary emulsifier with the primary emulsifier. In the first three samples, A, B, and C, the secondary emulsifier was the preferred emulsifier, a substituted cellulosic emulsifier. In these samples, the secondary emulsifier was Methocel F50, and was added at levels of 0.005, 0.01, and 0.02 PHM. Samples D, E, and F were run using a different substituted cellulosic, Methocel K100LV which is also a hydroxyl propylmethylcellulose. This emulsifier has a molecular weight which is roughly twice that of the Methocel F-50. The Methocel F-50 has a viscosity rating of about 50 centipoise. Samples D, E, and F were run at 0.005, 0.010, and .0.015 PHM, respectively.

Sample G is run using Alcotex 72.5 which is a PVA emulsifier having a hydrolysis percent of 72.5 percent. This polymerization was stable, and shows that the secondary emulsifier may be a hydrolyzed PVA. However, Example H, in which the secondary emulsifier was 0.02 parts Vinol 540, the polymerization was unstable. Properties for runs A through G are shown in Table I and these properties as well as the results of run H demonstrate that the secondary emulsifier, which acts as a colloidal stabilizer, can be either a substituted cellulosic or a hydrolyzed PVA although the substituted cellulosic is preferred.

EXAMPLE 4

The following samples were also run in the 55 liter reactor as previous described. In these samples, Methocel F-50 was used as a secondary emulsifier at a low level, 0.005 PHM. The primary emulsifier is Poval L9, and was used at a constant level. The samples were varied by the addition of an optional emulsifier, which is a hydrolyzed PVA. The samples, J through M have the additional amounts of emulsifier indicated in the table, namely Alcotex 78L, which is a PVA having 78 percent hydrolysis, Alcotex 72.5, which is a PVA, having 72.5 percent hydrolysis, and Vinol 540, which is a PVA having 88 percent hydrolysis. Alcotex is sold by Revertex Ltd. of England. These optional emulsifiers were added at 0.005 PHM. These samples show that the use of the optional emulsifier has a synergistic effect insofar as improved properties are achieved using lower total amounts of secondary and optional emulsifier than the secondary emulsifier previously used. Data for these samples is given in Table I.

It is most preferred that the optional emulsifier is Vinol 540. This particular optional emulsifier, when used in conjunction with the substituted cellulosic, has the additional synergistic effect of improving bulk density.

The desirability of the improved bulk density is discussed early. The preferred embodiment achieves a desirably density of at least 0.50 and preferably 0.52 gm/ml.

EXAMPLE 5

These examples were run using the 55 liter reactor and the procedure described earlier. In these as is polymerizations, different compounds were substituted in Samples N and 0 for the Poval L9, and specifically KZ-05 and KZ-06, respectively, saponified PVA products roughly equivalent to Poval L9, and sold by Nippon Goshei of Japan. In Sample P, SO1 by Revertex was used at 0.03 PHM. Data for Samples N-0 is given in Table I.

EXAMPLE 6

This example was run at manufacturing scale experimentation in the 16,500 gallon reactor as previously described. In the initial polymerization, Vinol 540 was added first, then the Methocel and Poval L9 were subsequently changed. The charge became unstable.

In subsequent charges using Poval L9 as a primary emulsifier in which the emulsifiers were either premixed or added simultaneously from the hopper, successful results were obtained for Methocel F-50 alone as a secondary emulsifier used at 0.005 nm, or for Methocel F-50, and an optional emulsifier at 0.005 to 0.01 nm comprising Gohsenol GH-20, an equivalent to Vinol 540, sold by Nippon Goshei of Japan. Using the Methocel and GH-20 mixture, 17 consecutive charges have been run.

EXAMPLE 7

Further manufacturing scale experimentation has been conducted in the 16,500 gallon reactor in which 7 consecutive charges have been run using Methocel F-50 at 0.005 PHM and Poval L9 at 0.035 PHM.

TABLE I

| Particle Size Mesh % Om | A | B | C | D | E | F |
|---|---|---|---|---|---|---|
| 40 | 2.55 | 0.50 | 0.0 | 0.00 | 0.00 | 0.00 |
| 60 | 43.37 | 8.46 | 0.5 | 0.51 | 0.50 | 0.50 |
| 80 | 23.98 | 44.28 | 1.0 | 24.24 | 13.57 | 2.97 |
| 100 | 9.18 | 17.41 | 7.0 | 34.85 | 31.16 | 13.37 |
| 140 | 15.31 | 23.88 | 67.50 | 36.87 | 49.25 | 62.38 |
| 200 | 5.62 | 4.97 | 22.50 | 3.03 | 5.02 | 18.81 |
| Pan | 0.00 | 0.50 | 1.50 | 0.51 | 0.50 | 1.98 |
| Avg. Part. Size (micron) | 238.23 | 183.51 | 119.16 | 157.58 | 147.26 | 125.30 |
| Part. Size Dist. (%) | 49.61 | 33.52 | 18.45 | 18.68 | 18.75 | 21.51 |
| DOP Porosity (gm/ml) | 0.425 | 0.529 | 0.350 | 0.313 | 0.423 | 0.291 |
| Apparent Bulk Density (gm/ml) | 0.461 | 0.404 | 0.460 | 0.550 | 0.463 | 0.523 |
| Powder Mix Time (sec) | 234.0 | 170.0 | 302.0 | 294.0 | 190.0 | 377.09 |

| Particle Size Mesh % Om | G | I | J | K | L | M |
|---|---|---|---|---|---|---|
| 40 | 0.50 | 0.00 | 0.00 | 0.00 | 0.00 | 0.00 |
| 60 | 28.36 | 1.00 | 2.48 | 6.40 | 0.50 | 0.50 |
| 80 | 52.24 | 16.00 | 21.29 | 23.65 | 10.89 | 14.00 |
| 100 | 13.93 | 26.50 | 29.21 | 26.60 | 26.24 | 26.50 |
| 140 | 4.97 | 46.50 | 42.08 | 38.92 | 49.50 | 50.50 |
| 200 | 0.00 | 9.00 | 4.46 | 3.94 | 11.39 | 8.00 |
| Pan | 0.00 | 1.00 | 0.50 | 0.49 | 1.49 | 0.50 |
| Avg. Part. Size (micron) | 219.83 | 144.85 | 132.52 | 156.40 | 140.39 | 143.32 |
| Prt. Size Dist. (%) | 19.38 | 24.20 | 22.53 | 26.17 | 23.86 | 21.32 |
| DOP Porosity (gm/ml) | 0.427 | 0.297 | 0.352 | 0.346 | 0.346 | 0.305 |
| Apparent Bulk Density (gm/ml) | 0.480 | 0.526 | 0.497 | 0.493 | 0.529 | 0.511 |
| Powder Mix Time (sec) | 204.0 | 313.0 | 272.0 | 285.0 | 245.0 | 272.0 |

| Particle Size Mesh % Om | N | O | P |
|---|---|---|---|
| 40 | 0.00 | 0.00 | 0.00 |
| 60 | 0.50 | 0.49 | 0.51 |
| 80 | 6.96 | 5.91 | 4.57 |
| 100 | 21.89 | 20.69 | 19.29 |
| 140 | 60.70 | 63.03 | 63.45 |
| 200 | 9.45 | 9.36 | 12.18 |
| Pan | 0.50 | 0.49 | 0.00 |
| Avg. Part. Size (micron) | 136.26 | 135.28 | 130.81 |
| Part. Size Dist. (%) | 19.13 | 18.46 | 18.06 |
| DOP Porosity (gm/ml) | 0.336 | 0.339 | 0.331 |
| Apparent Bulk Density (gm/ml) | 0.497 | 0.488 | 0.490 |
| Powder Mix Time (sec) | 338.0 | 309.0 | 412.0 |

While in accordance with the Patent Statutes, the best mode and preferred embodiment has been set forth, the scope of the invention is not limited thereto, but rather by the scope of the attached claims.

What is claimed is:

1. A polymerization method comprising the steps of
   (a) forming a mixture of vinyl chloride monomer and optional vinyl chloride comonomer and water in a reaction vessel, and bringing said mixture to a reaction temperature of more than about 40° C.;
   (b) allowing an initial period of from 0 to 15 minutes to elapse;
   (c) adding an emulsifier package to said reaction vessel, said emulsifier package comprising a partially saponified polyvinyl alcohol emulsifier having a degree of saponification of from about 60 to about 90 mole percent and a methanol index at 55° C. of up to about 60 percent and a secondary emulsifier comprising a substituted cellulosic dispersant;
   (d) allowing a second period of from 0 to 15 minutes to elapse; and
   (e) adding an effective amount of a catalyst to cause said polymerization to begin.

2. A method as set forth in claim 1, wherein said primary emulsifier is present in an amount of from about 0.026 to 0.06 parts per hundred monomer by weight, and said secondary emulsifier is present in an amount of from 0.002 to 0.02 parts by weight per hundred monomer.

3. A method as set forth in claim 2, wherein said primary emulsifier is present from about 0.03 to about 0.05 parts per hundred monomer and said secondary emulsifier is present from about 0.005 to about 0.01 parts per hundred monomer by weight.

4. A method as set forth in claim 3, wherein said emulsifier package further comprises from about 0 to about 0.2 parts per hundred monomer of a hydrolyzed polyvinyl acetate type dispersant having a percent hydrolysis greater than 68 percent.

5. A method as set forth in claim 4, wherein said additional dispersant is present at from 0.05 to 0.01 parts per hundred monomer by weight.

6. A method as set forth in claim 4, wherein said catalyst is present at from 0.03 to 0.05 parts per hundred resin.

7. A method as set forth in claim 6, wherein a catalyst emulsifier is added in amounts from about 0.004 to about 0.024 parts per hundred monomer with the catalyst.

8. A method as set forth in claim 7, wherein said reaction temperature is from about 40° to about 80° C.

9. A method as set forth in claim 8, wherein said initial delay is from 5 to 10 minutes, and said additional delay is from 5 to 10 minutes.

* * * * *